United States Patent Office 3,415,841
Patented Dec. 10, 1968

3,415,841
**6-AMINO-CHLORO-INDAZOLES AND N-ACYL-
ATED DERIVATIVES THEREOF**
Joseph Nordmann, Paris, and Henri Blaise Swierkot, Bondy, Seine-St-Denis, France, assignors to Etablissements Kuhlmann, Paris, France
No Drawing. Filed May 18, 1966, Ser. No. 550,920
Claims priority, application France, June 12, 1965, 20,589
1 Claim. (Cl. 260—310)

ABSTRACT OF THE DISCLOSURE

The compounds are 6-amino-chloro-indazoles and N-acylated derivatives thereof with anti-inflammatory and anti-rheumatic properties. Exemplary compounds are $N_1$-acetyl-6-acetylamino-3-chloro-indazole and $N_2$-acetyl-6-acetylamino-3-chloro-indazole.

---

The present invention relates to new medicines, with anti-inflammatory and anti-rheumatic properties, derived from indazole and having the general formula:

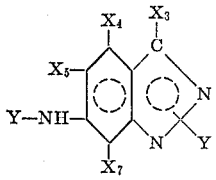

in which one X represents a chlorine atom, the others represent hydrogen atoms, and Y represents a hydrogen atom or an acyl group.

The invention also relates to novel compounds of the formula:

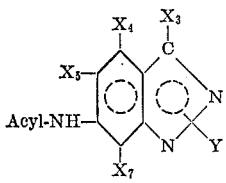

in which one X represents a chlorine atom, the others represent hydrogen atom and Y represents a hydrogen atom or an acyl group.

The 6-amino-chloroindazoles are described, for example, in French Patent No. 981,432, filed on Apr. 8, 1943, and in Liebig's Annalen, 454, page 313.

These products can be acylated by any organic acids, such as, for example, acetic, monochloracetic, propionic, succinic, glutaric, benzoic, 3,4,5-trimethoxybenzoic, 3,4,5-trimethoxybenzoylaminoacetic, glucuronic, nicotinic, anthranilic or camphoric acid. The acylation may be effected by any known general method; for example, a carboxylic acid halide, a carboxylic acid anhydride, an internal anhydride of a polycarboxylic acid, a mixed anhydride, a lactone or an oxazolone may be used as acylating agent. The acylation reaction may be carried out in the presence of an organic solvent such as benzene, acetone, dioxan, dimethyl formamide, or even in aqueous or acetic acid medium.

The invention is not restricted to the following examples of the preparation, and the parts indicated are parts by weight.

EXAMPLE 1

16.75 parts of 3-chloro-6-amino-indazole dissolved in 75 parts of glacial acetic acid are placed in an apparatus fitted with a rotary stirrer, a thermometer and a device for external cooling. The solution is slowly cooled to 5–8° C. and 12.25 parts of acetic anhydride are introduced with stirring. Stirring is continued for three hours while the temperature is allowed to return to that of the surrounding atmosphere. The next day, the crystalline mass is filtered off, washed with acetone, drained and dried. 15.50 parts of 3-chloro-6-acetylamino-indazole melting at 250° C. are obtained (instantaneous melting point on a Maquenne block). After concentration of the mother liquors from the reaction under vacuum, 2.50 parts of amide melting at 245° C. are obtained, i.e. 18 parts altogether.

3-chloro-6-acetylamino-indazole, when purified by crystallisation from methyl alcohol, forms colourless needles which are very sparingly soluble in cold water and slightly soluble in propylene glycol. It melts on a Maquenne block at 251–251.5° C.

EXAMPLE 2

A solution of 16.75 parts of 3-choro-6-amino-indazole in 25 parts of pyridine, then 23 parts of 3,4,5-trimethoxybenzoyl chloride also in 23 parts of pyridine, are successively introduced into an apparatus provided with a rotary stirrer, a thermometer and a calcium chloride trap. The temperature of the mixture is allowed to rise to about 50° C. and is maintained at this level for a quarter of an hour. After cooling, the reaction mixture is poured slowly into 100 parts of distilled water, and the crystalline mass obtained is filtered, washed with water and dried. 33 parts of 6-(3′,4′,5′-trimethoxybenzoylamino)-3-chloro-indazole are obtained. After crystallising from ethyl acetate and petrol ether, the product melts at 249° C. on a Maquenne block and at 239° C. on a Culatti block.

EXAMPLE 3

16.75 parts of 3-chloro-6-amino-indazole and 40 parts of glacial acetic acid are successively introduced into an apparatus provided with a stirrer, a gauge and a thermometer. Partial solution takes place. Then 25 parts of acetic anhydride are gradually introduced, and the temperature rises to 25° C. After a short period in solution, a precipitate appears. Stirring is maintained for half an hour at the ambient temperature. The precipitate is filtered off and washed with a little acetic acid. 23 parts of 6-acetylamino-3-chloro-$N_1$ (or $N_2$)-acetyl-indazole are thus obtained (yield 91%), which after purifying in 10 volumes of methyl alcohol, melts at 257° C. (Maquenne block).

*Analysis.*—Calculated for $C_{11}H_{10}N_3ClO_2$, percent: N, 16.69; Cl, 14.08. Found, percent: N, 16.20; Cl, 14.40.

EXAMPLE 4

50 parts of 2-(3′,4′,5′-trimethoxy-phenyl)-5-oxazolone are dissolved at 35° C. in 100 parts of dry dioxan in an apparatus containing a stirrer, a thermometer and a heating device. In addition, 33.5 parts of 3-chloro-6-amino-indazole are dissolved in 100 parts of dry dioxan while heating to 45–50° C., and the solution obtained is rapidly added to the first solution. The temperature of the mixture is kept at 55–60° C. When the reaction ends, a solid mass is formed. After cooling, this is filtered, washed with dioxan and dried. 68 parts of crude 6(3′,4′,5′-trimethoxy-benzoylamino-acetylamino) - 3 - chloro-indazole melting at 290° C. (Maquenne block) are thus obtained. Yield compared with theory: 81%. The product thus obtained is purified by dissolving in 2 volumes of dimethyl formamide and subsequent addition at 30° C. of 4 volumes of ethyl alcohol. It has a melting point of 294° C.

*Analysis.*—Calculated for $C_{19}H_{19}N_4ClO_5$, percent: C, 54.48; H, 4.57; N, 13.57. Found, percent: C, 54.67; H, 5.06; N, 13.23.

Toxicity

The toxicities were determined orally on C 57 black mice, the products being suspended in water containing 3% gum at various concentrations from 3% to 10%. The maximum non-toxic doses obtained were as follows:

| | Maximum non-toxic dose in g./kg. |
|---|---|
| 6-acetylamino-3-chloro-indazole | 0.5 |
| 6-(3',4',5'-trimethoxy - benzoyl-glycylamino)-3-chloro-indazole | 2.5 |
| $N_1$(or $N_2$)-acetyl-6-acetylamino-3-chloro-indazole | 2.0 |
| 3-chloro-6-amino-indazole | 0.2 |

The autopsy performed on the animals which had received toxic doses revealed that in all cases the organs are anatomically normal, that all these products cause a vasodilating action of the various vascular systems, more especially at pulmonary and digestive levels, as well as a modification of the pigmentation of the hepatic lobes.

Pharmacological properties

The derivatives of the invention were studied within the compass of the following antiphlogistic tests:

GRANULOMA TEST (R. MELER ET AL., EXPERIENTIA, 1950, 6, 469)

This test consists in inserting a plug of compressed cottonwool measuring 4 to 5 mms. and weighing about 50 mgs. under the skin of a rat. This insertion of a neutral foreign body causes ten days later a granuloma, sometimes purulent, which is then removed and weighed. The weights of the granulomas of the control animals and the treated animals are then statistically compared, the treated animals having received the various derivatives orally once a day starting from the insertion.

The results obtained are as follows:

| Product | Dose in g./kg. | Percent decrease in weight of the granulomas | Statistical value P< |
|---|---|---|---|
| 6-acetylamino-3-chloro-indazole | 0.168 | 28 | 0.001 |
| 6-(3',4',5'-trimethoxy-benzoyl-glycylamino)-3-chloro-indazole | 0.830 | 20 | 0.001 |
| $N_1$ (or $N_2$)-acetyl-6-acetylamino-3-chloro-indazole | 0.667 | 30 | 0.001 |
| 3-chloro-6-amino-indazole | 0.033 | 31 | 0.001 |

TESTS BASED ON THE MODIFICATION OF THE VASCULAR PERMEABILITY

These tests are based on the comparative measurement of an experimental oedema caused by intradermal injections in the first metatarsal space of the hind paw, of various pharmacodynamic agents. For these tests C 57 black mice are used with either a 25γ dose of histamine or a 5γ dose of 5-hydroxy-tryptamine being injected. The oedema is evaluated 45 minutes after the injection by comparison of the weight of the injected paw, generally the right hind paw, with the weight of the non-injected paw (left hind paw).

The percentage reduction of the oedema was determined statistically on the batches of control animals which had received only the inflammatory agent compared with the batches of twenty animals which had previously received twice daily for 3 days the product to be studied. These tests have been described in general principle by E. Kelemen, Brit. J. Pharmacol., 1957, 12, 20.

Some examples of the results obtained by these methods are collected in the table below:

| Product | Dose injected in g./kg. | Percent reduction of the oedema | |
|---|---|---|---|
| | | Test with histamine injection | Test with 5-hydroxy-tryptamine injection |
| 6-acetylamino-3-chloro-indazole | 0.168 | 37 | 55 |
| 6- 3',4',5'-trimethoxy-benzoyl-glycylamino)-3-chloro-indazole | 0.830 | 31 | 45 |

In addition, the products are shown to be without action on the central nervous system. They have in fact no anti-convulsive action and they are without effect on gastric ulcer due to strain.

Finally, all these tests show that these various derivatives of the indazole series have pharmacological properties which are common to them and are manifested by important antiphlogistic efforts on tests of very diverse nature.

Applications

The medicines according to the invention may be administered to subjects attacked by rheumatism or other inflammatory syndromes at a dose of 0.3 to 1 g. per day, for example, in the form of compressed tablets, gelatin-coated pills or cachets.

We claim:
1. A compound of the formula

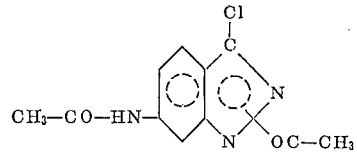

References Cited

UNITED STATES PATENTS 2,478,048  8/1947  Kwartler _____ 260—239.9

FOREIGN PATENTS 577,804  5/1946  Great Britain.

OTHER REFERENCES

Fries et al., Liebigs Annal. Chem. vol. 454, pages 312–313 relied on (1927).

Petitcolas et al., Bul. Soc. Chim. (France), 1950, pages 466–69 and 476–7 relied on.

HENRY R. JILES, *Primary Examiner.*

NATALIE TROUSOF, *Assistant Examiner.*

U.S. Cl. X.R.

167—65; 260—295.5, 307, 211